(12) United States Patent  
Mizoguchi et al.

(10) Patent No.: US 12,443,221 B2
(45) Date of Patent: Oct. 14, 2025

(54) ELECTRONIC APPARATUS CHASSIS AND ELECTRONIC APPARATUS

(71) Applicant: LENOVO (SINGAPORE) PTE. LTD., Singapore (SG)

(72) Inventors: Fumitake Mizoguchi, Yokohama (JP); Shinichi Kubota, Yokohama (JP); Hideki Tanabe, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 234 days.

(21) Appl. No.: 18/519,049

(22) Filed: Nov. 26, 2023

(65) Prior Publication Data

US 2024/0241539 A1 Jul. 18, 2024

(30) Foreign Application Priority Data

Jan. 13, 2023 (JP) .................................. 2023003808

(51) Int. Cl.
*G06F 1/16* (2006.01)

(52) U.S. Cl.
CPC .......... *G06F 1/1616* (2013.01); *G06F 1/1601* (2013.01); *G06F 1/1656* (2013.01)

(58) Field of Classification Search
CPC ..... G06F 1/1616; G06F 1/1601; G06F 1/1656
See application file for complete search history.

(56) References Cited

U.S. PATENT DOCUMENTS

| 4,912,602 | A | * | 3/1990 | Zurek | ................. | H04M 1/0252 |
| | | | | | | 361/752 |
| 5,255,154 | A | * | 10/1993 | Hosoi | ..................... | G06F 1/203 |
| | | | | | | 361/740 |
| 5,301,132 | A | * | 4/1994 | Akahane | ............... | G06F 1/1656 |
| | | | | | | 361/679.09 |
| 5,331,508 | A | * | 7/1994 | Hosoi | .................. | G06F 1/1662 |
| | | | | | | 361/679.02 |
| 5,355,278 | A | * | 10/1994 | Hosoi | .................. | G06F 1/1662 |
| | | | | | | 361/679.08 |
| 5,515,240 | A | * | 5/1996 | Rodeffer | ................... | H05K 5/15 |
| | | | | | | 361/740 |
| 6,111,760 | A | * | 8/2000 | Nixon | .................. | H04B 1/3833 |
| | | | | | | 361/752 |

(Continued)

FOREIGN PATENT DOCUMENTS

JP 200617066 A 6/2006
JP 2017045853 A 3/2017

*Primary Examiner* — Anthony M Haughton
*Assistant Examiner* — Theron S Milliser
(74) *Attorney, Agent, or Firm* — SHIMOKAJI IP

(57) ABSTRACT

An electronic apparatus chassis includes a first chassis member, a second chassis member, and screws that fasten the chassis members to each other. In addition, the electronic apparatus chassis includes an engagement piece and a receiving portion that connect each of edge portions of the first chassis member to the second chassis member. In the electronic apparatus chassis, the first chassis member and the second chassis member are configured such that the relative positions thereof are not substantially changed when the screw is loosened and removed from the screw hole, and a relative movement thereof is provided in a direction away from each other when the screw is loosened and removed from the screw hole.

7 Claims, 8 Drawing Sheets

(56) References Cited

U.S. PATENT DOCUMENTS

| | | | | |
|---|---|---|---|---|
| 6,507,484 B2* | 1/2003 | Fukuyoshi | | G06F 1/1637 |
| | | | | 361/679.58 |
| 7,542,274 B2* | 6/2009 | Minaguchi | | G06F 1/1662 |
| | | | | 361/679.55 |
| 7,710,728 B2* | 5/2010 | Arisaka | | G06F 1/203 |
| | | | | 361/752 |
| 7,778,016 B2* | 8/2010 | Minaguchi | | G06F 1/1616 |
| | | | | 361/679.08 |
| 7,957,127 B2* | 6/2011 | Minaguchi | | G06F 1/1635 |
| | | | | 429/96 |
| 8,988,865 B2* | 3/2015 | Matsumoto | | H05K 5/0217 |
| | | | | 361/679.08 |
| 9,606,575 B2* | 3/2017 | Gerst | | H05K 5/0221 |
| 9,713,274 B2* | 7/2017 | Takayuki | | H05K 7/142 |
| 10,409,334 B1* | 9/2019 | Kitamura | | G06F 1/1662 |
| 10,429,900 B1* | 10/2019 | Kitamura | | H01H 13/86 |
| 2001/0036057 A1* | 11/2001 | Fukuyoshi | | G06F 1/1616 |
| | | | | 361/679.26 |
| 2005/0110761 A1* | 5/2005 | Minaguchi | | G06F 1/1635 |
| | | | | 345/168 |
| 2008/0259537 A1* | 10/2008 | Arisaka | | G06F 1/203 |
| | | | | 361/759 |
| 2009/0059487 A1* | 3/2009 | Minaguchi | | G06F 1/1662 |
| | | | | 361/679.09 |
| 2009/0059488 A1* | 3/2009 | Minaguchi | | G06F 1/1635 |
| | | | | 361/679.09 |
| 2013/0308261 A1* | 11/2013 | Matsumoto | | G06F 1/1662 |
| | | | | 361/747 |
| 2015/0077958 A1* | 3/2015 | Takayuki | | H05K 7/142 |
| | | | | 361/759 |
| 2015/0277487 A1* | 10/2015 | Gerst | | H05K 5/0221 |
| | | | | 361/679.01 |
| 2017/0280574 A1* | 9/2017 | Takayuki | | G06F 1/1658 |
| 2019/0302852 A1* | 10/2019 | Kitamura | | G06F 3/0202 |
| 2024/0241539 A1* | 7/2024 | Mizoguchi | | G06F 1/1601 |

* cited by examiner

ELECTRONIC APPARATUS CHASSIS AND ELECTRONIC APPARATUS

BACKGROUND OF THE INVENTION

Field of the Invention

The present invention relates to an electronic apparatus chassis and an electronic apparatus.

Description of the Related Art

A chassis of an electronic apparatus such as a laptop PC or a tablet PC is usually configured in a flat box shape by stacking and connecting two chassis members (see, for example, Japanese Patent No. 6212522).

SUMMARY OF THE INVENTION

In the above-described electronic apparatus, a user needs to be able to access an inside of the chassis by removing a chassis member for maintenance or component replacement.

By the way, as described in Japanese Patent No. 6212522, many electronic apparatus chassis have a structure in which the chassis members are connected to each other by using a screw and a hook-shaped engagement piece in combination. In an electronic apparatus chassis of this type, when removing the chassis member, it is necessary to first loosen all the screws, and then insert a special tool such as a spatula into a minute gap between the chassis members to remove the engagement piece. For this reason, in such an electronic apparatus chassis, not only the tool such as the spatula is required to remove the chassis member, but also it is difficult to know where to insert the tool in relation to a position of the engagement piece, resulting in low work efficiency.

The present invention has been made in consideration of the above problems of the related art, and an object of the present invention is to provide an electronic apparatus chassis and an electronic apparatus in which a chassis member is able to be easily removed.

An electronic apparatus chassis according to a first aspect of the present invention includes a first chassis member formed in a substantially rectangular plate shape; a second chassis member to which the first chassis member is connected in an attachable and detachable manner; a first screw configured to fasten one first edge portion to the second chassis member and a second screw configured of a pair of edge portions of the first chassis member in a width direction to fasten the other second edge portion to the second chassis member; a third screw configured with a falling prevention screw held in the first chassis member and configured to fasten the first chassis member to the second chassis member at a position between the first screw and the second screw based on the width direction; a first screw hole into which the first screw is screwed, a second screw hole into which the second screw is screwed, and a third screw hole into which the third screw is screwed that are provided in the second chassis member; a first engagement piece that is provided in an inner surface of the first edge portion of the first chassis member and has a first claw portion protruding toward an outside of the first edge portion; a second engagement piece that is provided in an inner surface of the second edge portion of the first chassis member and has a second claw portion protruding toward an outside of the second edge portion; and a first receiving portion that is provided in the second chassis member and where the first engagement piece is engaged and disengaged, and a second receiving portion where the second engagement piece is engaged and disengaged, in which the first chassis member and the second chassis member are configured such that relative positions of each other are not substantially changed when the first screw and the second screw are loosened and removed from the first screw hole and the second screw hole, and a relative movement of each other is provided in a direction away from each other when the third screw is loosened and removed from the third screw hole.

An electronic apparatus chassis according to a second aspect of the present invention includes a first chassis member formed in a substantially rectangular plate shape; a second chassis member to which the first chassis member is connected in an attachable and detachable manner; a first screw configured to fasten one first edge portion of a pair of edge portions of the first chassis member in a width direction to the second chassis member and a second screw configured to fasten the other second edge portion to the second chassis member; a third screw configured to fasten the first chassis member to the second chassis member at a position between the first screw and the second screw based on the width direction; a first screw hole into which the first screw is screwed, a second screw hole into which the second screw is screwed, and a third screw hole into which the third screw is screwed that are provided in the second chassis member; a first engagement piece that is provided in an inner surface of the first edge portion of the first chassis member and has a first claw portion protruding toward an outside of the first edge portion; a second engagement piece that is provided in an inner surface of the second edge portion of the first chassis member and has a second claw portion protruding toward an outside of the second edge portion; and a first receiving portion that is provided in the second chassis member and where the first engagement piece is engaged and disengaged, and a second receiving portion where the second engagement piece is engaged and disengaged, in which the first screw has a first non-screw portion that is inserted into a first hole portion formed in the first chassis member in a state of being relatively moved in an axial direction and a first screw portion that is provided on a tip side of the first non-screw portion, and a length of the first screw portion is shorter than a distance at which the first non-screw portion is relatively movable with respect to the first hole portion, the second screw has a second non-screw portion that is inserted into a second hole portion formed in the first chassis member in a state of being relatively moved in the axial direction and a second screw portion that is provided on a tip side of the second non-screw portion, and a length of the second screw portion is shorter than a distance at which the second non-screw portion is relatively movable with respect to the second hole portion, and the third screw is configured with a falling prevention screw held by the first chassis member and has a third non-screw portion that is inserted into a third hole portion formed in the first chassis member in a state of being relatively moved in the axial direction and a third screw portion that is provided on a tip side of the third non-screw portion, and a length of the third screw portion is longer than a distance at which the third non-screw portion is relatively movable with respect to the third hole portion.

According to the above aspects of the present invention, the chassis member is able to be easily removed.

DETAILED DESCRIPTION OF THE INVENTION

An electronic apparatus chassis and an electronic apparatus including the electronic apparatus chassis according to the present invention will be described in detail below with preferred embodiments with reference to the accompanying drawings.

Figure 1:
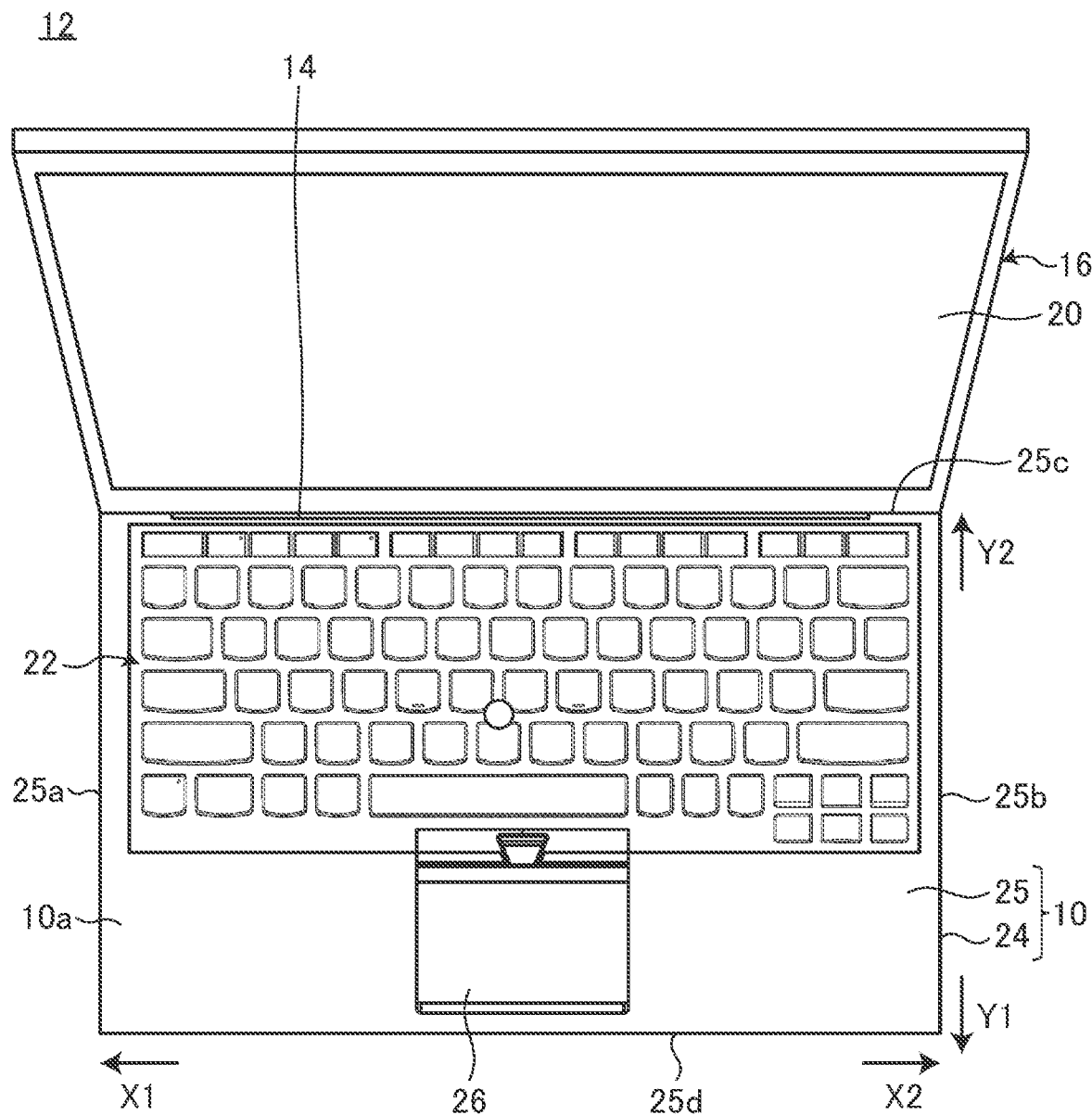
FIG. 1 is a plan view of an electronic apparatus including an electronic apparatus chassis according to an embodiment.

FIG. 1 is a plan view of an electronic apparatus 12 including an electronic apparatus chassis 10 according to an embodiment. In the present embodiment, a configuration in which the electronic apparatus chassis 10 (hereinafter, may be simply referred to as "chassis 10") is applied to the electronic apparatus 12 which is a laptop PC is illustrated. The electronic apparatus to which the electronic apparatus chassis 10 is applicable may be, for example, a tablet PC, a desktop PC, a smartphone, a mobile phone, or the like, in addition to the laptop PC.

FIG. 1 illustrates a state (usage aspect) where a display chassis 16 is opened from the chassis 10 by a hinge 14. The display chassis 16 is relatively rotatably connected to a rear edge portion of the chassis 10 via the hinge 14. The display chassis 16 is mounted with a display 20 configured of, for example, an organic EL or a liquid crystal.

In the following, regarding the chassis 10, in a direction seen by a user who operates a keyboard device 22 while looking at the display 20 in a usage aspect illustrated in FIG. 1, left and right width directions are referred to as X1 and X2 directions, front and rear depth directions are referred to as Y1 and Y2 directions, and upper and lower thickness directions are referred to as Z1 and Z2 directions. The X1 and X2 directions may be collectively referred to as the X direction, and the Y1 and Y2 directions, and the Z1 and Z2 directions may be similarly referred to the Y direction and the Z direction.

The chassis 10 has a structure in which a first chassis member 24 and a second chassis member 25 are connected to each other, and has a flat box shape. The keyboard device 22 is an input operation unit that is fixed to the second chassis member 25 and faces a front surface 10a of the chassis 10. The front surface 10a of the chassis 10 may be provided with an input operation unit such as a touch pad device 26 or the like on the front side of the keyboard device 22. Inside the chassis 10, various electronic components such as a board 27 (see FIG. 5A) in which a Central Processing Unit (CPU) and a memory are mounted, and a battery device are housed.

Next, a specific configuration example of the electronic apparatus chassis 10 according to the present embodiment will be described.

Figure 2:
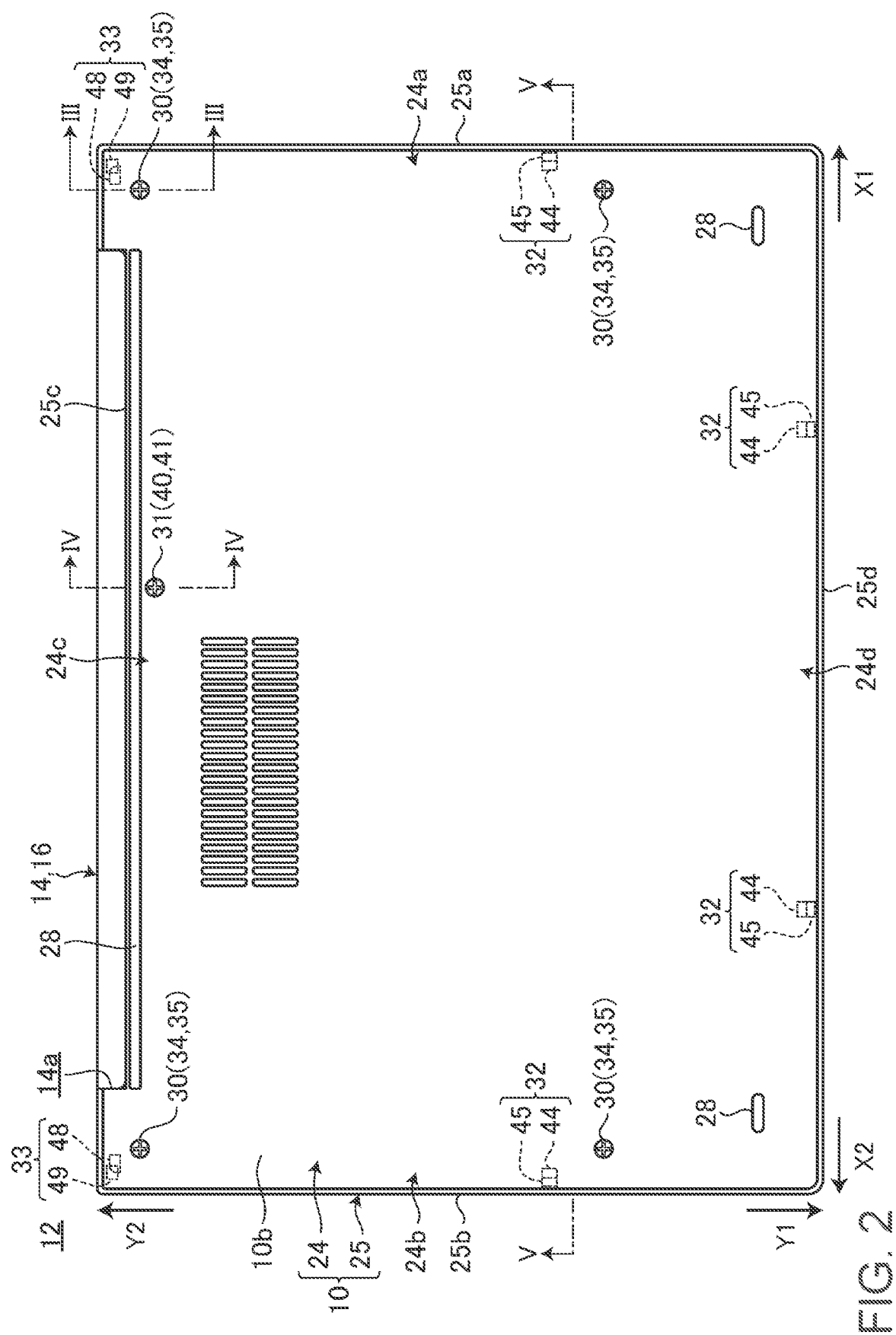
FIG. 2 is a bottom view of the chassis.
Figure 3A:
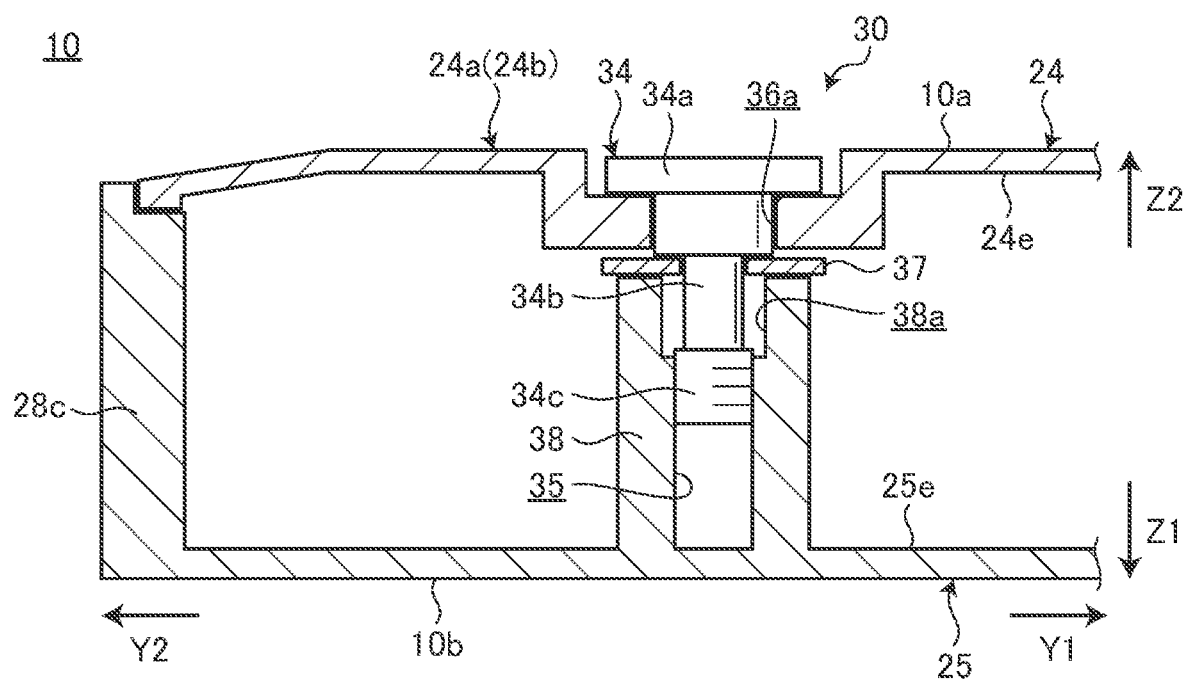
FIG. 3A is a schematic sectional view taken along line III-III in FIG. 2.
Figure 3B:
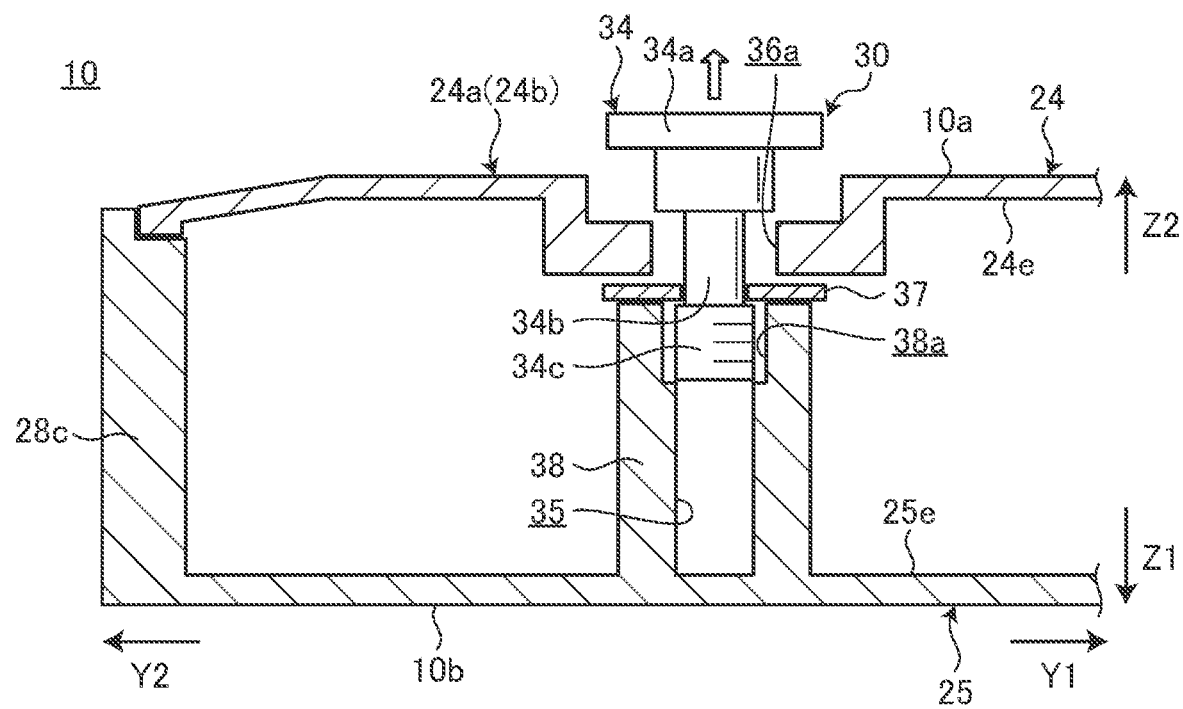
FIG. 3B is a view illustrating a state where a screw illustrated in FIG. 3A is loosened.
Figure 4A:
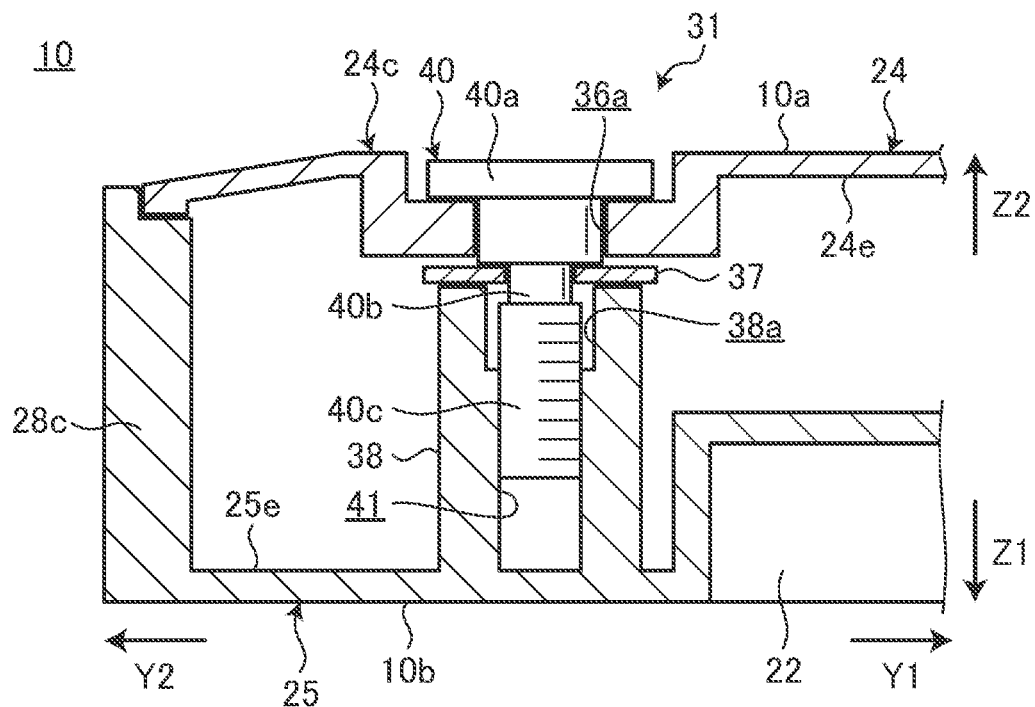
FIG. 4A is a schematic sectional view taken along line IV-IV in FIG. 2.
Figure 4B:
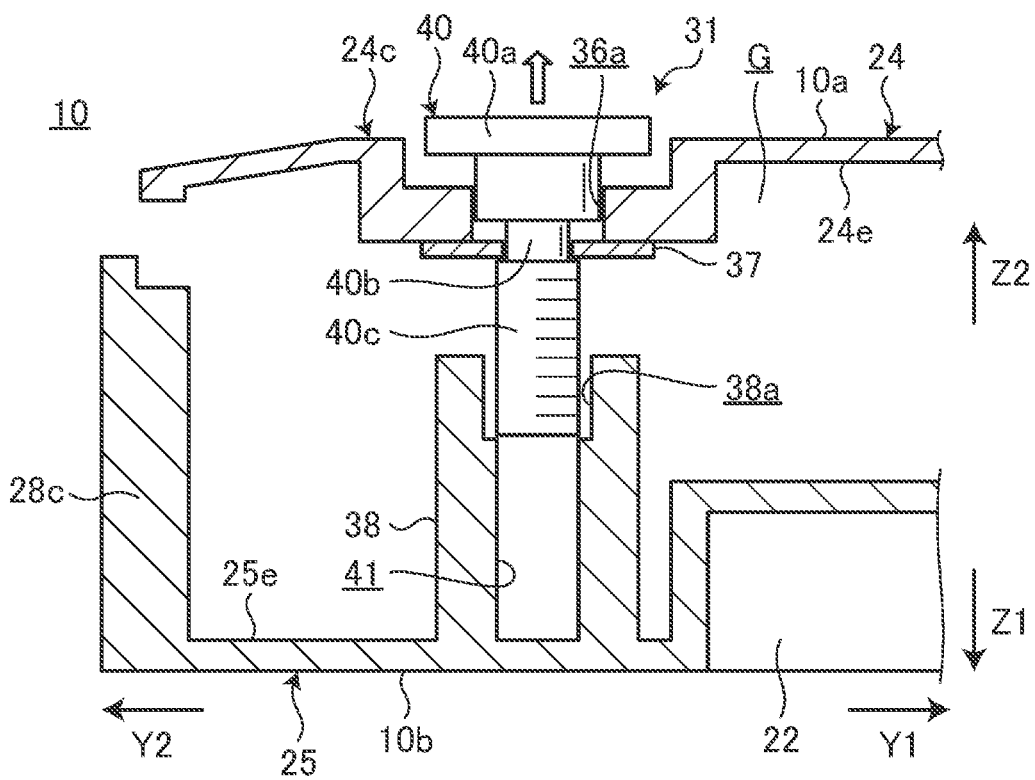
FIG. 4B is a view illustrating a state where a screw illustrated in FIG. 4A is loosened.
Figure 5A:
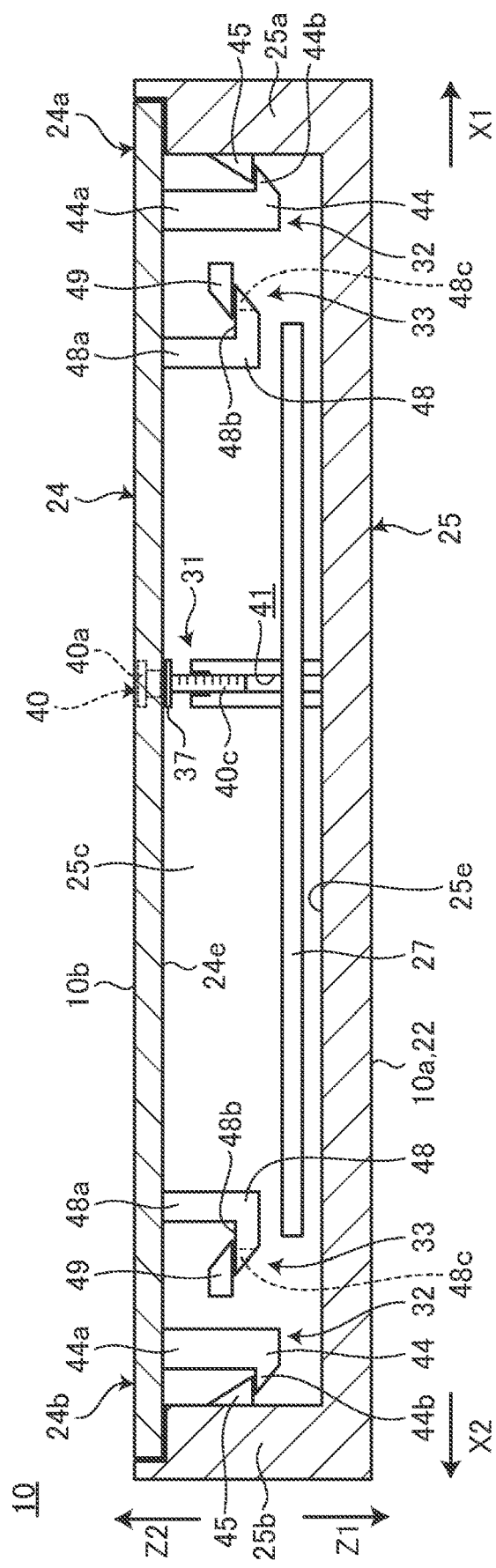
FIG. 5A is a schematic sectional view taken along line V-V in FIG. 2.
Figure 5B:
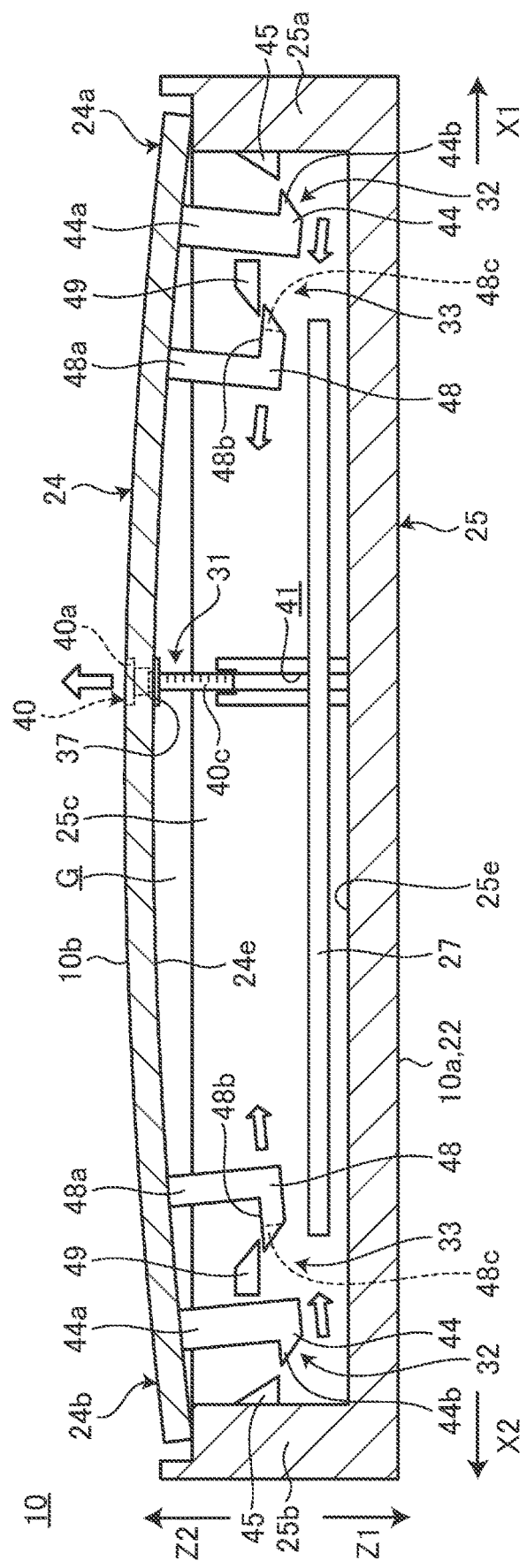
FIG. 5B is a view illustrating a state where a screw illustrated in FIG. 5A is loosened.

FIG. 2 is a bottom view of the chassis 10. FIG. 3A is a schematic sectional view taken along line III-III in FIG. 2. FIG. 3B is a view illustrating a state where a screw 34 illustrated in FIG. 3A is loosened. FIG. 4A is a schematic sectional view taken along line IV-IV in FIG. 2. FIG. 4B is a view illustrating a state where a screw 40 illustrated in FIG. 4A is loosened. FIG. 5A is a schematic sectional view taken along line V-V in FIG. 2. FIG. 5B is a view illustrating a state where the screw 40 illustrated in FIG. 5A is loosened.

As illustrated in FIGS. 2 and 5A, the first chassis member 24 is formed in a substantially rectangular plate shape, and forms a bottom surface 10b of the chassis 10. The second chassis member 25 is formed in a substantially rectangular bathtub shape, and has standing walls 25a to 25d forming four peripheral side surfaces of the chassis 10 on four peripheral edge portions. The first chassis member 24 is a lid that closes a bottom surface-side opening of the second chassis member 25. The standing walls 25c forming a side surface on a Y2 side of the chassis 10 have a recess portion 14a in most thereof except for left and right both ends. The recess portion 14a is a space for installing the hinge 14. Reference numeral 28 in FIG. 2 is a rubber leg fixed to an appropriate position on the bottom surface 10b.

The chassis members 24 and 25 are formed of a metal material such as magnesium or aluminum, a resin material such as ABS resin or glass fiber reinforced plastic, or a carbon material such as carbon fiber reinforced plastic. The shapes and materials of the chassis members 24 and 25 are able to be appropriately changed.

As illustrated in FIG. 2, the first chassis member 24 is connected to the second chassis member 25 in an attachable and detachable manner by using two types of fastening portions 30 and 31, and two types of engagement portions 32 and 33.

As illustrated in FIGS. 2 and 3A, the fastening portion 30 includes the screw 34 and a screw hole 35 to which the screw 34 is screwed. The fastening portion 30 fastens one (X1 side) edge portion 24a and the other (X2 side) edge portion 24b to the second chassis member 25 in the left-right width direction of the first chassis member 24. For example, the fastening portions 30 are provided at two locations each along a longitudinal direction (Y direction) of the edge portions 24a and 24b.

As illustrated in FIG. 3A, the screw 34 has a head portion 34a, a non-screw portion 34b, and a screw portion 34c. The head portion 34a is accommodated in a counterbore 36 formed on the bottom surface 10a of the first chassis member 24.

The non-screw portion 34b is a cylindrical portion that is provided between the head portion 34a and the screw portion 34c, and has no screw thread formed on an outer peripheral surface. In the case of the present embodiment, the non-screw portion 34b has a stepped structure having a large-diameter portion protruding from the head portion 34a and a small-diameter portion protruding from the large-diameter portion. The large-diameter portion of the non-screw portion 34b is inserted through the hole portion 36a formed through a bottom portion of the counterbore 36 of the first chassis member 24 in a state of being relatively movable in an axial direction. The small-diameter portion of the non-screw portion 34b is inserted into a washer 37 in a state of being relatively movable in the axial direction. The washer 37 is disposed on an inner surface 24e side of the first chassis member 24. The non-screw portion 34b may not have the stepped structure and in this case, an entire length of the non-screw portion 34b may be configured as a small-diameter portion, and may be inserted into the hole portion 36a and the washer 37.

The screw portion 34c is a portion which is provided on a tip side of the non-screw portion 34b and in which a male screw is formed on an outer peripheral surface. A length (effective length) of the screw portion 34c is shorter than a distance at which the non-screw portion 34b is relatively movable with respect to the hole portion 36a and the washer 37.

The screw hole 35 is a female screw formed on an inner peripheral surface of a cylindrical boss portion 38. The boss portion 38 is formed to protrude in the Z2 direction from the inner surface 25e of the second chassis member 25. The boss portion 38 is formed with a hole portion 38a continuous from an open end of the screw hole 35 and having a diameter larger than that of the screw hole 35. The hole portion 38a has a structure in which a female screw is not formed on the inner peripheral surface and is not screwed with the screw portion 34c. A length of the hole portion 38a in the axial direction is longer than a length of the screw portion 34c of the screw 34.

As illustrated in FIGS. 3A and 3B, the screw 34 of the present embodiment is a falling prevention screw (capture screw) that is held to prevent coming-off against the first chassis member 24 by holding the washer 37 in a state where the non-screw portion 34b is inserted into the hole portion 36a. The screw 34 may not be the falling prevention screw, but the falling prevention screw is preferable in consideration of handleability, loss prevention, and the like when the first chassis member 24 is removed from the second chassis member 25.

As illustrated in FIGS. 2 and 4A, the fastening portion 31 is configured with the screw 40 and the screw hole 41 to which the screw 40 is screwed. The fastening portion 31 fastens the edge portion 24c of the first chassis member 24 on the Y2 side, which is substantially orthogonal to the edge portions 24a and 24b, to the second chassis member 25. The fastening portion 31 of the present embodiment is provided at only one location in the vicinity of a center of the edge portion 24c in the longitudinal direction (Y direction). The fastening portions 31 may be provided at two locations, for example, straddling the center of the edge portion 24c in the X direction. In addition, in the fastening portion 31 and the peripheral portion thereof illustrated in FIGS. 4A and 4B, the same reference numerals are used for the components that have the same or similar functions and effects as those of the fastening portion 30 and the peripheral portion thereof illustrated in FIGS. 3A and 3B, detailed description thereof will be omitted, and the same applies to each of the following drawings.

As illustrated in FIG. 4A, the screw 40 has a head portion 40a, a non-screw portion 40b, and a screw portion 40c. The head portion 40a is accommodated in the counterbore 36.

The non-screw portion 40b is a cylindrical portion that is provided between the head portion 40a and the screw portion 40c, and has no screw thread formed on the outer peripheral surface. In the case of the present embodiment, the non-screw portion 40b has a stepped structure having a large-diameter portion protruding from the head portion 40a and a small-diameter portion protruding from the large-diameter portion. The non-screw portion 40b is inserted into the hole portion 36a in a state where the large-diameter portion is relatively movable in the axial direction, and the small-diameter portion is inserted into the washer 37 in a state where the small-diameter portion is relatively movable in the axial direction. The non-screw portion 40b may not have a stepped structure and in this case, an entire length of the non-screw portion 40b may be configured with the small-diameter portion and inserted into the hole portion 36a and the washer 37.

The screw portion 40c is provided on a tip side of the non-screw portion 40b, and a length (effective length) of the screw portion 40c, which is a portion where a male screw is formed on the outer peripheral surface, is longer than a distance at which the non-screw portion 40b is relatively movable with respect to the hole portion 36a and the washer 37.

The screw hole 41 is a female screw formed on the inner peripheral surface of the boss portion 38 formed in the second chassis member 25. In the boss portion 38 in which the screw hole 41 is formed, a length of the hole portion 38a in the axial direction is shorter than the length of the screw portion 40c of the screw 40.

As illustrated in FIGS. 4A and 4B, the screw 40 of the present embodiment is a falling prevention screw that is held to prevent coming-off against the first chassis member 24 by holding the washer 37 in a state where the non-screw portion 40b is inserted into the hole portion 36a.

As illustrated in FIGS. 2 and 5A, the engagement portion 32 is configured with an engagement piece 44 and a receiving portion 45. The engagement portion 32 is a hook-shaped latch-type engagement portion that connects the edge portions 24a, 24b, and 24d of the first chassis member 24 to the second chassis member 25. The edge portion 24d extends in the X direction on the Y1 side of the first chassis member 24. In the configuration example illustrated in FIG. 2, the edge portion 24d is connected to the second chassis member 25 by only the engagement portion 32, but the fastening portion 30 may be provided here.

As illustrated in FIG. 5A, the engagement piece 44 has a protruding piece 44a and a claw portion 44b.

The protruding piece 44a is a thin plate piece that protrudes in the Z1 direction from the inner surface 24e of the first chassis member 24. The claw portion 44b protrudes from the tip of the protruding piece 44a toward the outside of each of the edge portions 24a, 24b, and 24d. That is, the claw portion 44b of the edge portion 24a protrudes in the X1 direction. The claw portion 44b of the edge portion 24b protrudes in the X2 direction. The claw portion 44b of the edge portion 24d protrudes in the Y1 direction. A surface of the claw portion 44b on the Z2 side is formed of a flat surface and serves as a locking surface with respect to the receiving portion 45. A surface of the claw portion 44b on the Z1 side is formed of an inclined surface that is gradually inclined toward the tip on the Z2 side, and serves as a riding surface when the claw portion 44b is engaged with the receiving portion 45.

The receiving portion 45 is a claw-shaped projection that protrudes from the inner wall surface of each of the standing walls 25a, 25b, and 25d of the second chassis member 25 that corresponds to each of the edge portions 24a, 24b, and 24d. A surface of the receiving portion 45 on the Z2 side is formed of an inclined surface that is gradually inclined toward the tip on the Z1 side, and serves as a riding surface when the claw portion 44b is engaged. A surface of the receiving portion 45 on the Z1 side is formed of a flat surface and serves as a locking surface of the claw portion 44b.

Figure 6A:
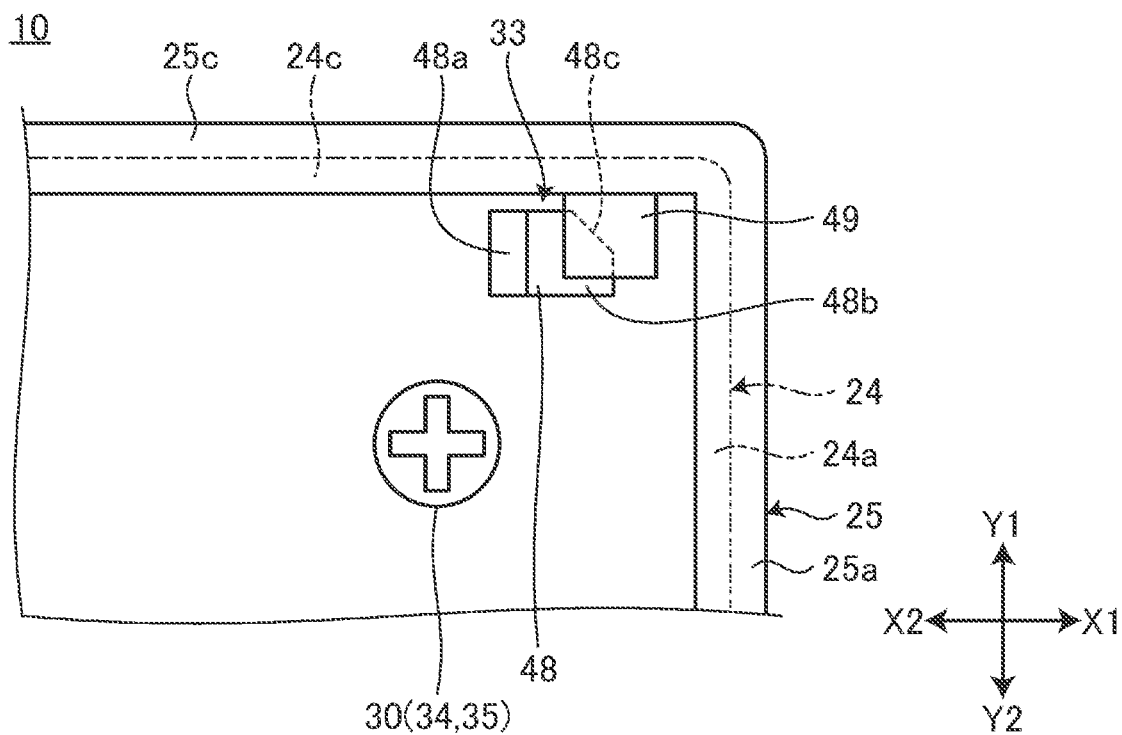
FIG. 6A is a bottom view of a chassis in which an engagement portion and a peripheral portion thereof are enlarged.
Figure 6B:
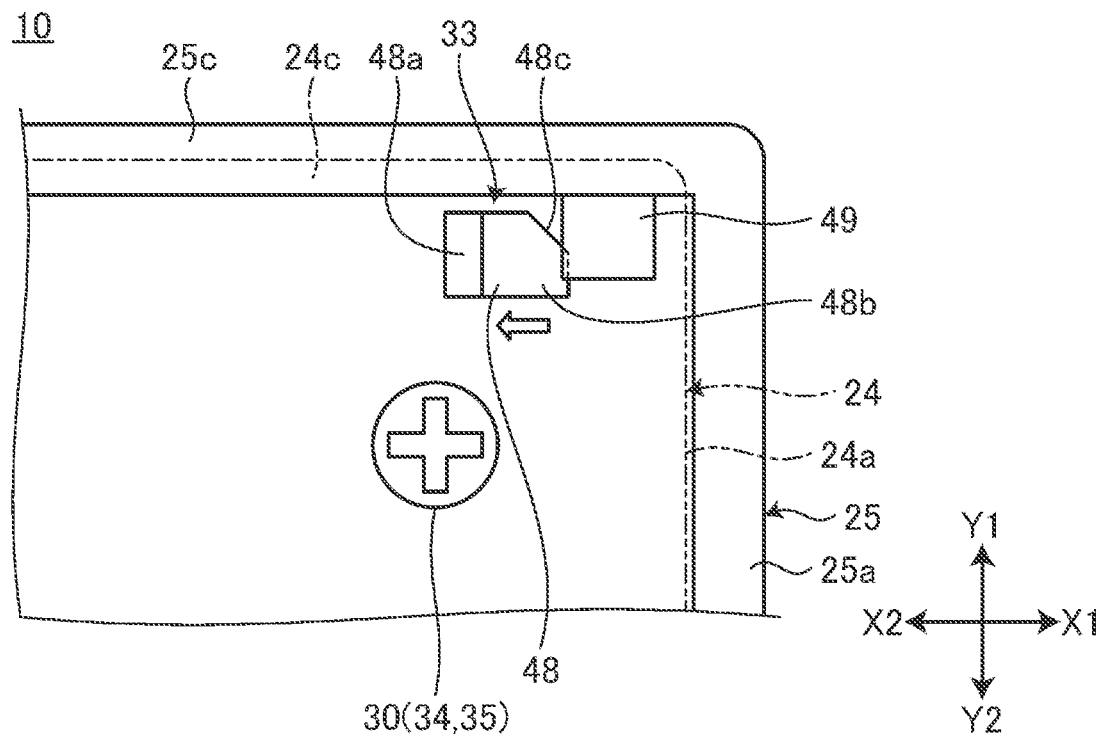
FIG. 6B is a view illustrating a state where a screw is loosened from the state illustrated in FIG. 6A.
Figure 7A:
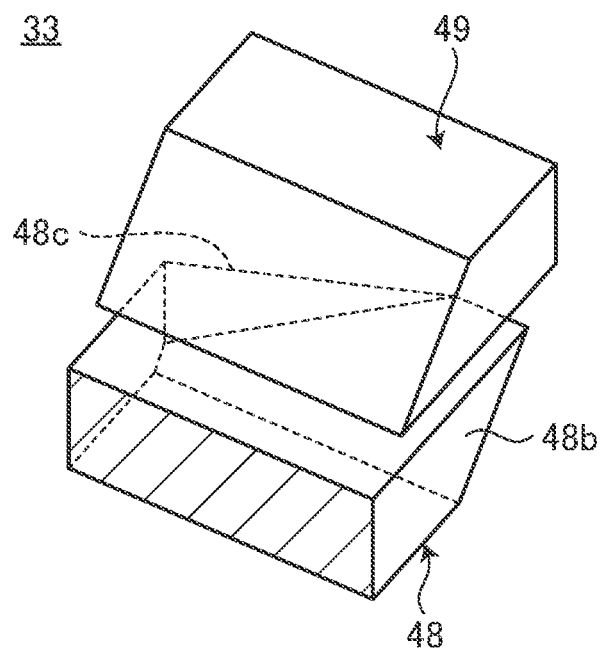
FIG. 7A is a schematic perspective view of an engagement piece and a receiving portion that configures the engagement portion.
Figure 7A:
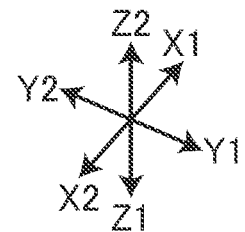
Figure 7B:
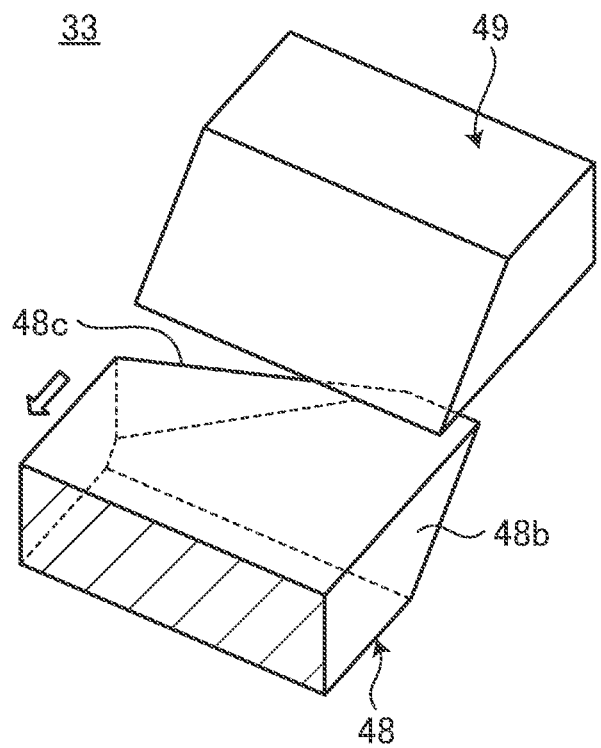
FIG. 7B is a view illustrating a state where the screw is loosened and the engagement piece is moved from the state illustrated in FIG. 7A.
Figure 7B:
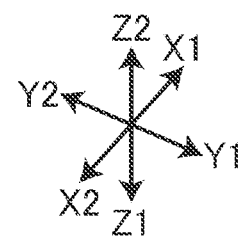

FIG. 6A is a bottom view of the chassis 10 in which the engagement portion 33 and the peripheral portion thereof are enlarged. FIG. 6B is a view illustrating a state where the screw 40 is loosened from the state illustrated in FIG. 6A. In addition, in FIGS. 6A and 6B, the engagement portion 33 and the peripheral portion thereof on the X1 side are enlarged, and an outer shape of the first chassis member 24 is illustrated by a two-dot chain line. FIG. 7A is a schematic perspective view of the engagement piece 48 and the receiving portion 49 that configure the engagement portion 33. FIG. 7B is a view illustrating a state where the screw 40 is loosened and the engagement piece 48 is moved from the state illustrated in FIG. 7A. In addition, FIGS. 7A and 7B are views in which the engagement piece 48 is cut at a root of the claw portion 48b and the protruding piece 48a is not illustrated.

As illustrated in FIGS. 2 and 5A to 7B, the engagement portion 33 is configured with the engagement piece 48 and the receiving portion 49. The engagement portion 33 is a hook-shaped latch-type engagement portion that connects the edge portion 24c of the first chassis member 24 to the second chassis member 25. The engagement portions 33 are respectively provided in the vicinity of both end portions of the edge portion 24c in the longitudinal direction.

As illustrated in FIGS. 5A to 7B, the engagement piece 48 has the protruding piece 48a, the claw portion 48b, and a notch portion 48c.

The protruding piece 48a is a thin plate piece that protrudes in the Z1 direction from the inner surface 24e of the first chassis member 24. The claw portion 48b extends from the tip of the protruding piece 48a in the X direction along the edge portion 24c, and protrudes in a direction opposite to the fastening portion 31 (screw 40) side. That is, the claw portion 48b of the engagement piece 48 on the X1 side protrudes toward the X1 direction. The claw portion 48b of the engagement piece 48 on the X2 side protrudes toward the X2 direction. A surface of the claw portion 48b on the Z2 side is formed of a flat surface and serves as a locking surface with respect to the receiving portion 49. A surface of the claw portion 48b on the Z1 side is formed of an inclined surface that is gradually inclined on the Z2 side toward the tip, and serves as a riding surface when the claw portion 48b is engaged with the receiving portion 49.

The notch portion 48c is formed such that a part of a tip side portion of the claw portion 48b, specifically, a corner portion of the claw portion 48b on the Y2 side is notched. The claw portion 48b has the notch portion 48c, so that a surface area of the engagement surface with the receiving portion 49 is reduced.

The receiving portion 49 is a claw-shaped projection that protrudes from the inner wall surface of the standing wall 25c of the second chassis member 25 that corresponds to the edge portion 24c and faces the X direction. The receiving portion 49 on the X1 side is formed of an inclined surface whose surface on the Z2 side is gradually inclined on the Z1 side toward the X2 side, and serves as a riding surface when the claw portion 48b is engaged. The receiving portion 49 on the X2 side is formed of an inclined surface whose surface on the Z2 side is gradually inclined toward the Z1 side toward the X1 side, and serves as a riding surface when the claw portion 48b is engaged. A surface of the receiving portion 49 on the Z1 side is formed of a flat surface, and serves as a locking surface of the claw portion 48b.

Next, one procedure of an operation of removing the first chassis member 24 from the second chassis member 25 will be described.

As illustrated in FIGS. 3A, 4A, and 5A, in the chassis 10, in a state where the chassis members 24 and 25 are connected, the screws 34 and 40 are tightened to the screw holes 35 and 41, and the engagement pieces 44 and 48 are engaged with the receiving portions 45 and 49. When the first chassis member 24 is removed from the second chassis member 25 from this state, as illustrated in FIG. 2, the display chassis 16 is closed on the front surface 10a of the chassis 10 and the bottom surface 10b is facing up.

First, all the screws 34 and 40 exposed on the bottom surface 10b are loosened from the screw holes 35 and 41 with a tool such as a screwdriver and removed. In the present embodiment, a total of five screws 34 and 40 may be removed in any order.

At this time, as illustrated in FIGS. 3A and 3B, in the screw 34 of the fastening portion 30, the length of the screw portion 34c is shorter than a distance at which the non-screw portion 34b is relatively movable with respect to the hole portion 36a and the washer 37. Therefore, the screw 34 does not change the positions of the hole portion 36a and the washer 37 in the Z direction even when the non-screw portion 34b moves in the Z2 direction until the screw portion 34c is removed from the screw hole 35. That is, in the fastening portion 30, when the screw 34 is removed from the screw hole 35, the washer 37 does not press the first chassis member 24 in the Z2 direction, and does not substantially change a relative position between the chassis members 24 and 25. The relative position between the chassis members 24 and 25 is not substantially changed means a concept includes not only a case where the relative position does not change at all, but also a case where the first chassis member 24 is slightly moved due to friction with the screw 34, the washer 37, or the inner peripheral surface of the hole portion 36a, for example, as the screw 34 moves in the Z2 direction. In short, a configuration may be such that the screw 34 does not positively press the first chassis member 24 when being removed from the screw hole 35.

On the other hand, as illustrated in FIGS. 4A and 4B, in the screw 40 of the fastening portion 31, the length of the screw portion 40c is longer than a distance at which the non-screw portion 40b is relatively movable with respect to the hole portion 36a and the washer 37. Therefore, the screw 40 is further moved in the Z2 direction even after the non-screw portion 40b is relatively moved with respect to the hole portion 36a and the washer 37 when the screw portion 40c is removed from the screw hole 41. As a result, the screw 40 presses the washer 37 in the Z2 direction at the root portion of the screw portion 40c, and presses the first chassis member 24 in the Z2 direction separated from the second chassis member 25 via the washer 37. Therefore, the chassis members 24 and 25 relatively move in a direction away from each other.

On the other hand, when an operation of removing the screw 40 from the screw hole 41 is started, the engagement piece 44, which forms the engagement portion 32, is in a state of being engaged with the receiving portion 45. That is, in the first chassis member 24, in a state where the edge portions 24a and 24b on both end sides are engaged with the second chassis member 25 via the engagement portion 32 in the width direction (X direction) with the screw 40 as the substantially center, only the center portion is gradually lifted up in the Z2 direction by the screw 40. The engagement piece 48, which forms the engagement portion 33, is also engaged with the receiving portion 49 at a position close to the edge portions 24a and 24b.

In other words, when the substantially center of the first chassis member 24 in the X direction is lifted up by the screw 40 in the Z2 direction, the edge portions 24a and 24b on both end sides thereof are held by the engagement portions 32. Therefore, as illustrated in FIG. 5B, the first chassis member 24 is elastically deformed and curved so that the substantially center in the X direction bulges to the Z2 side. In other words, in the first chassis member 24, the edge portions 24a and 24b respectively move to the center side in the X direction.

Then, when the screw 40 is completely removed from the screw hole 41, as illustrated in FIG. 5B, the claw portion 44b of the engagement piece 44 moves to a completely separated position or a substantially separated position from the receiving portion 45, and the engagement state in the engagement portion 32 is in a state of being completely released or substantially released.

On the other hand, the engagement portion 33 is for connecting the edge portion 24c to the second chassis member 25. Therefore, the receiving portion 49 is not directly formed on the standing walls 28a and 28b corresponding to the edge portions 24a and 24b, but is disposed at a position offset to the center side from the standing walls 28a and 28b in the X direction. Therefore, as illustrated in FIGS. 5B, 6B, and 7B, when the screw 40 is completely removed from the screw hole 41, the claw portion 48b of the engagement piece 48 moves to some extent in a direction of disengaging from the receiving portion 49 as the edge portions 24a and 24b move toward the center side in the X direction. However, the engagement state of the engagement portion 33 is not completely released. However, in this state, since only the tip portion of the claw portion 48b is locked to the receiving portion 49, a locking area of each other is small. In addition, the locking area between the claw portion 48b and the receiving portion 49 is further reduced by the action of the notch portion 48c.

Therefore, since a gap G (see FIG. 5B) between the chassis members 24 and 25 formed by the lifting-up action of the screw 40 is a mark, the user is able to hook a fingertip or the like into the gap G to lift up the first chassis member 24 from the second chassis member 25 on the Z2 side. Then, the engagement portion 32, which is on the opposite side to the gap G in the Y direction and is still in the engagement state, serves as a rotation fulcrum, and the first chassis member 24 rotates such that the edge portion 24c side is lifted up in the Z2 direction. Therefore, not only the engagement portions 33 of the edge portions 24a and 24b that are already substantially released from the engagement state, but also the engagement state of the engagement portions 33 that are engaged with a small locking area are easily released. Then, the edge portion 24c of the first chassis member 24 is largely lifted up from the second chassis member 25, or the first chassis member 24 is pulled from the second chassis member 25 in the Y2 direction, so that the engagement state of the engagement portion 32 of the edge portion 24d is also able to be easily released. Therefore, the user is able to easily remove the first chassis member 24 from the second chassis member 25.

As described above, the chassis 10 of the present embodiment includes the screw (first screw) 34 that fastens one edge portion (first edge portion) 24a of the pair of edge portions 24a and 24b of the first chassis member 24 in the width direction to the second chassis member 25, the screw (second screw) 34 that fastens the other edge portion (second edge portion) 24b to the second chassis member 25, and the screw (third screw) 40 that is held in the first chassis member 24 and fastens the first chassis member 24 to the second chassis member 25 at a position between the screws 34 and 34 that fasten the edge portions 24a and 24b based on the X direction. In addition, the chassis 10 includes the screw hole (first screw hole) 35 which is provided in the second chassis member 25 and into which the screw 34 of the edge portion 24a is screwed, the screw hole (second screw hole) 35 into which the screw 34 of the edge portion 24b is screwed, and the screw hole (third screw hole) 41 into which the screw 40 is screwed. Further, the chassis 10 includes the engagement piece (first engagement piece) 44 that is provided in the inner surface 24e of the edge portion 24a and has the claw portion (first claw portion) 44b protruding toward the outside of the edge portion 24a, the engagement piece (second engagement piece) 44 that is provided in the inner surface 24e of the edge portion 24b and has the claw portion (second claw portion) 44b protruding toward the outside of the edge portion 24b, the receiving portion (first receiving portion) 45 that is provided in the second chassis member 25 and where the engagement piece 44 of the edge portion 24a is engaged and disengaged, and the receiving portion (second receiving portion) 45 where the engagement piece 44 of the edge portion 24b is engaged and disengaged.

Here, the first chassis member 24 and the second chassis member 25 constituting the chassis 10 of the present embodiment may be configured such that the relative positions thereof may not be substantially changed when the screw 34 is loosened and removed from the screw hole 35, and the relative movement thereof is provided in a direction away from each other when the screw 40 is loosened and removed from the screw hole 41.

In addition, in the chassis 10 of the present embodiment, the screw 34 has the non-screw portion 34b that is inserted into the hole portion 36a formed in the first chassis member 24 in a state of being relatively moved in the axial direction and the screw portion 34c that is provided on the tip side of the non-screw portion 34b, and the length of the screw portion 34c is shorter than the distance at which the non-screw portion 34b is relatively movable with respect to the hole portion 36a. Furthermore, in the chassis 10, the screw 40 is configured with the falling prevention screw held by the first chassis member 24 and has the non-screw portion 40b that is inserted into the hole portion 36a formed in the first chassis member 24 in a state of being relatively moved in the axial direction and the screw portion 40c that is provided on the tip side of the non-screw portion 40b, and the length of the screw portion 40c may be longer than the distance at which the non-screw portion 40b is relatively movable with respect to the hole portion 36a.

As a result, in the chassis 10, when the chassis members 24 and 25 are removed, it is only necessary to loosen and remove each of the screws 34 and 40 from each of the screw holes 35 and 41. Then, in the chassis 10, the gap G is formed between the chassis members 24 and 25 by the screw 40 located between the screws 34 and 34. At the same time, due to the curved deformation of the first chassis member 24, it is possible to move each of the engagement pieces 44, which are provided on the edge portions 24a and 24b located on both end sides in the X direction, in a direction of being separated and disengaged to and from each receiving portion 45. As a result, the user is able to easily remove the first chassis member 24 from the second chassis member 25 only by hooking the fingertip or the like in the gap G and lifting up the first chassis member 24 from the second chassis member 25. Therefore, for the chassis 10, a special tool such as a spatula is not required to remove the chassis members 24 and 25.

The chassis 10 may include the engagement piece (third engagement piece) 48b that is provided in the inner surface 24e of the edge portion (third edge portion) 24c of the first chassis member 24 intersecting the edge portions 24a and 24b, and has the claw portion (third claw portion) 48b protruding in a direction opposite to the screw 40 side along the edge portion 24c, and the receiving portion (third receiving portion) 49 that is provided on the second chassis member 25 and where the engagement piece 48 is engaged and disengaged. Here, the claw portion 48b may have the notch portion 48c formed by notching a part of the tip surface thereof, and have a configuration such that the surface area of the engagement surface with respect to the receiving portion 49 is reduced by the notch portion 48c. Then, a sufficient locking area is able to be secured while reducing the locking area between the engagement piece 48 and the receiving portion 49 for fixing the edge portion 24c which is the same as the screw 40. Therefore, stable engagement is able to be secured in the engagement portion 33 in a state where the chassis members 24 and 25 are connected to each other, and when the chassis members 24 and 25 are removed, the engagement state in the engagement portions 33 is able to be released more easily.

In the chassis 10, the length of the screw portion 40c is preferably longer than the length of the screw portion 34c. Then, the screw 40 is able to lift up the first chassis member 24 more greatly from the second chassis member 25, the gap G is able to be sufficiently widened, and the engagement portions 32 and 33 is able to be operated more reliably in the disengagement direction. For example, in a case where the length of the screw portion 40c is 2.8 mm, the length of the screw portion 34c may be 1.8 mm. In this case, for example, the relative movable distance of the non-screw portion 40b with respect to the hole portion 36a and the washer 37 may be sufficiently smaller than 2.8 mm, and the relative movable distance of the non-screw portion 34b with respect to the hole portion 36a and the washer 37 may be larger than 1.8 mm.

In addition, it is preferable that the screw 34 has a configuration such that the screw portion 34c is shorter than the non-screw portion 34b and the first chassis member 24 is not reliably lifted up from the second chassis member 25 when loosening. That is, unlike the screw 40, the screw 34 is located on the edge portions 24a and 24b in the vicinity of the engagement portions 32 and 33. Therefore, when the screw 34 is loosened, if the screw 34 is configured to lift up the first chassis member 24 from the second chassis member 25, the first chassis member 24 is able to be curved and deformed, and the gap G cannot be formed. Furthermore, when the screw 34 lifts up the first chassis member 24, in each of the engagement portions 32 and 33, since the engagement pieces 44 and 48, and the receiving portions 45 and 49 are strongly pressed against each other in the Z direction, there is a concern that the engagement pieces 44 and 48 are damaged, and it is not easy to release the engagement state. Therefore, unlike the screw 40, it is preferable that the screw 34 is configured such that the first chassis member 24 is not lifted up from the second chassis member 25.

It goes without saying that the present invention is not limited to the embodiments described above, and is able to be freely modified without departing from the spirit of the present invention.

The disposition of the fastening portions 30 and 31 and the engagement portions 32 and 33 described above may be appropriately changed. However, the fastening portion 31 is required to be at a position between the left and right fastening portions 30 and 30 in a predetermined width direction (for example, the X direction) of the chassis members 24 and 25.

The invention claimed is:

1. An electronic apparatus chassis comprising:
a first chassis member having a substantially rectangular plate shape;
a second chassis member connected to the first chassis member in an attachable and detachable manner;
a first screw configured to fasten one first edge portion of a pair of edge portions of the first chassis member in a width direction to the second chassis member, and a second screw configured to fasten a second edge portion to the second chassis member;
a third screw configured as a falling prevention screw in the first chassis member and configured to fasten the first chassis member to the second chassis member at a position between the first screw and the second screw based on the width direction;
a first screw hole into which the first screw is screwed, a second screw hole into which the second screw is screwed, and a third screw hole into which the third screw is screwed, all of which holes are in the second chassis member;
a first engagement piece in an inner surface of the first edge portion of the first chassis member and which has a first claw portion protruding toward an outside of the first edge portion;
a second engagement piece in an inner surface of the second edge portion of the first chassis member and which has a second claw portion protruding toward an outside of the second edge portion; and
a first receiving portion in the second chassis member and whereat the first engagement piece is engaged and disengaged, and a second receiving portion whereat the second engagement piece is engaged and disengaged,
wherein the first chassis member and the second chassis member are configured so that their relative positions are not substantially changed when the first screw and the second screw are loosened and removed from the first screw hole and the second screw hole, and are further configured so that their relative movement is in a direction away from each other when the third screw is loosened and removed from the third screw hole.

2. An electronic apparatus chassis comprising:
a first chassis member having a substantially rectangular plate shape;
a second chassis member connected to the first chassis member in an attachable and detachable manner;
a first screw configured to fasten one first edge portion of a pair of edge portions of the first chassis member in a width direction to the second chassis member, and a second screw configured to fasten a second edge portion to the second chassis member;
a third screw configured to fasten the first chassis member to the second chassis member at a position between the first screw and the second screw based on the width direction;
a first screw hole into which the first screw is screwed, a second screw hole into which the second screw is screwed, and a third screw hole into which the third screw is screwed, all of which holes are in the second chassis member;
a first engagement piece in an inner surface of the first edge portion of the first chassis member and which has a first claw portion protruding toward an outside of the first edge portion;

a second engagement piece in an inner surface of the second edge portion of the first chassis member and which has a second claw portion protruding toward an outside of the second edge portion; and a first receiving portion in the second chassis member and whereat the first engagement piece is engaged and disengaged, and a second receiving portion whereat the second engagement piece is engaged and disengaged, wherein the first screw has a first non-screw portion that is inserted into a first hole portion in the first chassis member when being relatively moved in an axial direction, and has a first screw portion on a tip side of the first non-screw portion, wherein a length of the first screw portion is shorter than a distance that the first non-screw portion is relatively movable with respect to the first hole portion, the second screw has a second non-screw portion that is inserted into a second hole portion in the first chassis member when being relatively moved in the axial direction, and has a second screw portion on a tip side of the second non-screw portion, wherein a length of the second screw portion is shorter than a distance that the second non-screw portion is relatively movable with respect to the second hole portion, and the third screw configured as a falling prevention screw in the first chassis member and has a third non-screw portion that is inserted into a third hole portion in the first chassis member when being relatively moved in the axial direction, and has a third screw portion on a tip side of the third non-screw portion, wherein a length of the third screw portion is longer than a distance that the third non-screw portion is relatively movable with respect to the third hole portion.

3. The electronic apparatus chassis according to claim 1, further comprising:
a third engagement piece in an inner surface of a third edge portion of the first chassis member and intersects the first edge portion and the second edge portion, and has a third claw portion protruding in a direction opposite to a third screw portion side along the third edge portion, and
a third receiving portion on the second chassis member and whereat the third engagement piece is engaged and disengaged.

4. The electronic apparatus chassis according to claim 3, wherein the third claw portion has a notch portion at a tip surface of the third claw portion, wherein a surface area of an engagement surface of the third receiving portion is reduced by the notch portion.

5. The electronic apparatus chassis according to claim 1, wherein the first screw has a first non-screw portion that is inserted into a first hole portion in the first chassis member when being relatively moved in an axial direction, and has a first screw portion on a tip side of the first non-screw portion, wherein a length of the first screw portion is shorter than a distance that the first non-screw portion is relatively movable with respect to the first hole portion, the second screw has a second non-screw portion that is inserted into a second hole portion in the first chassis member when being relatively moved in the axial direction, and has a second screw portion on a tip side of the second non-screw portion, wherein a length of the second screw portion is shorter than a distance that the second non-screw portion is relatively movable with respect to the second hole portion, and the third screw is configured as a falling prevention screw in the first chassis member and has a third non-screw portion that is inserted into a third hole portion in the first chassis member when being relatively moved in the axial direction, and has a third screw portion on a tip side of the third non-screw portion, wherein a length of the third screw portion is longer than a distance that the third non-screw portion is relatively movable with respect to the third hole portion.

6. The electronic apparatus chassis according to claim 2, wherein the length of the third screw portion is longer than the length of the first screw portion and longer than the length of the second screw portion.

7. An electronic apparatus comprising:
the electronic apparatus chassis according to claim 1;
an electronic component on an inner side of the electronic apparatus chassis; and
an input operation unit on a front surface of the electronic apparatus chassis,
wherein the second chassis member constitutes the front surface of the electronic apparatus chassis, and
the first chassis member constitutes a bottom surface of the electronic apparatus chassis.

* * * * *